United States Patent
Peng (10) Patent No.: US 7,145,970 B2
(45) Date of Patent: Dec. 5, 2006

(54) FREQUENCY OFFSET DETECTOR FOR AFC UNDER RAYLEIGH FADING

(75) Inventor: Bao-Chi Peng, Hsin-Chu (TW)

(73) Assignee: Beno Corporation, Tao-Yuan Hsien (TW)

( * ) Notice: Subject to any disclaimer, the term of this patent is extended or adjusted under 35 U.S.C. 154(b) by 729 days.

(21) Appl. No.: 10/604,264

(22) Filed: Jul. 7, 2003

(65) Prior Publication Data

US 2005/0008108 A1    Jan. 13, 2005

(51) Int. Cl.
 *H04L 27/06* (2006.01)
(52) U.S. Cl. ............... 375/344; 455/164.1; 455/192.2
(58) Field of Classification Search ............... 375/344
 See application file for complete search history.

(56) References Cited

U.S. PATENT DOCUMENTS 5,802,117 A * 9/1998 Ghosh ....................... 375/344
6,097,770 A * 8/2000 Bahai et al. ................ 375/343

* cited by examiner

*Primary Examiner*—Kevin Kim
(74) *Attorney, Agent, or Firm*—Winston Hsu (57) ABSTRACT

A frequency offset detector for AFC under Rayleigh fading. The AFC includes a variable phase generator, an exponential term $e^{j\Delta{10^7} t}$ multiplied on an incoming signal, a low-pass filter, a gain amplifier, a multiplier, and an offset detector. The offset detector includes a filter, an amplifier, a delay block, three adders, and two blocks that output the absolute value of an inputted signal. The filter is a Finite Impulse Response (FIR) filter that produces a Hilbert Transformation of the inputted complex gain. The Hilbert FIR filter, together with the complex gain and two of the adders, generate two complex signals: Xp and Xn respectively representing the positive and negative frequency components of the inputted complex gain. The detector output is equal to the difference between the magnitudes of Xp and Xn.

14 Claims, 10 Drawing Sheets

FREQUENCY OFFSET DETECTOR FOR AFC UNDER RAYLEIGH FADING

BACKGROUND OF INVENTION

1. Field of the Invention

This invention relates to Automatic Frequency Control during communications between a base station and a mobile unit in a $3^{rd}$ Generation Partnership Project wireless communications network. More specifically, a device and method to compensate for a Doppler shift induced frequency offset between the base station and the mobile unit is disclosed.

2. Description of the Prior Art

A mobile unit in a wireless communications network functions in a difficult environment. Structures and terrain scatter and reflect a signal transmitted from a base station to the mobile unit. As a result, the signal picked up by a receiving antenna is a sum of all the scattered and reflected, or multipath, signals. In general, the quality of this received multipath signal is affected by two major factors.

The first factor is called slow fading or lognormal fading. Slow fading results from absorption of the signal by terrain between the base station and the mobile unit. A good example of slow fading is a mobile unit moving through a tunnel, possibly resulting in loss of signal strength.

The second factor is called fast fading, multipath fading, or Rayleigh fading. Rayleigh fading results when the multipath signals arrive at the mobile unit and combine destructively, possibly causing a loss of the entire bandwidth. Another form of Rayleigh fading is a Doppler shift in frequency due to motion of the mobile unit relative to the base station.

Figure 1:
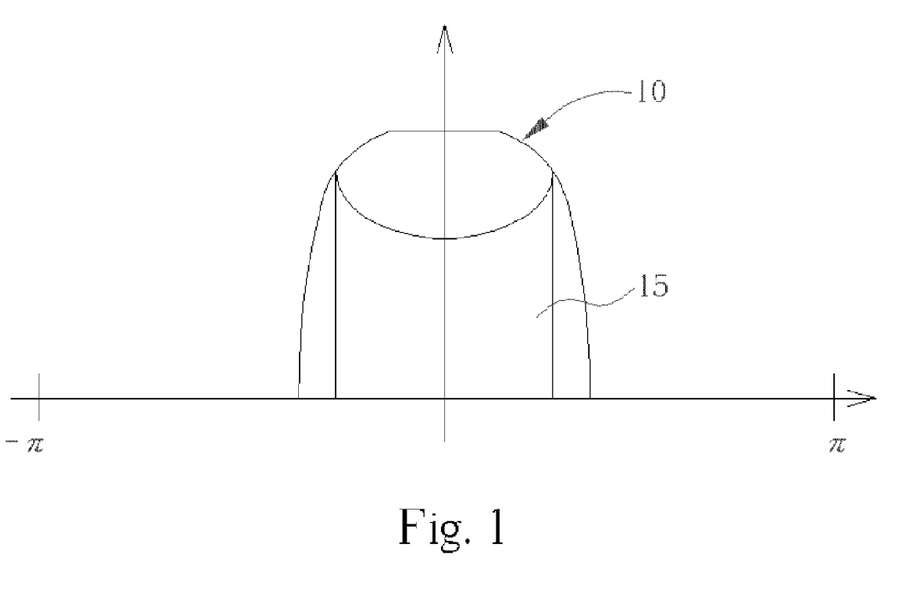
FIG. 1 illustrates the spectrum of a channel complex gain without a frequency offset.
Figure 2:
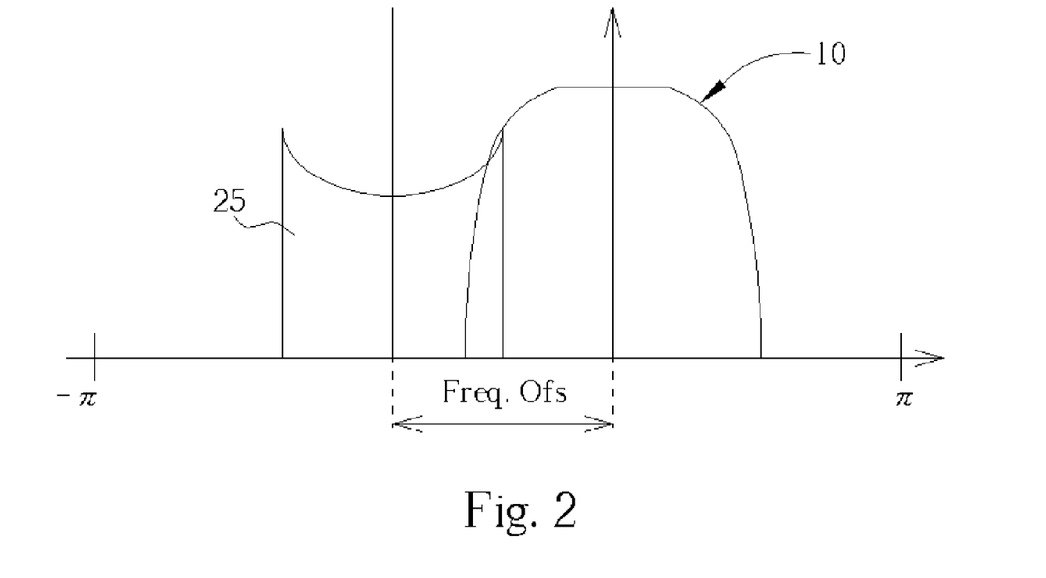
FIG. 2 illustrates an example spectrum of a channel complex gain with a frequency offset.

The frequency shift between the transmitter and the receiver interferes with many functions in a Wideband Code Division Multiple Access (WCDMA) Universal Mobile Telecommunications System Terrestrial Radio Access Network (UTRAN). For example, the bandwidth of Channel Estimation (CE) in the WCDMA must be designed for the Doppler spread. This is easily illustrated. FIG. 1 shows a spectrum of channel complex gain 15 of a received signal neatly centered within an allotted bandwidth 10 when no frequency offset exists. FIG. 2 shows how signals are distorted when a received signals spectrum of channel complex gain 25 falls outside of the allotted bandwidth 10 due to a frequency offset.

Figure 3:
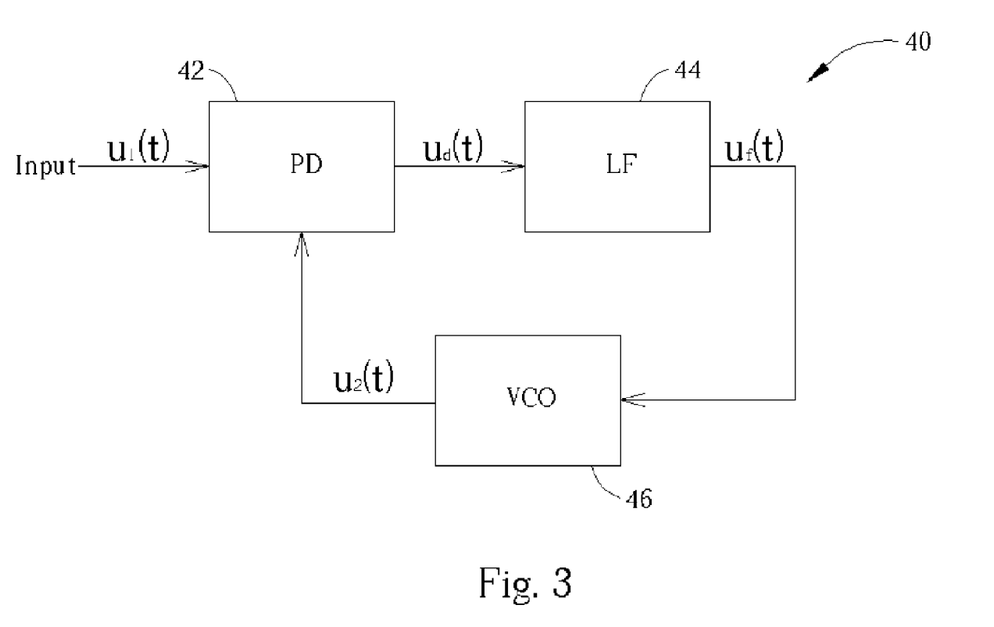
FIG. 3 is a block diagram of a general phase-locked loop for automatic frequency control.

An Automatic Frequency Control (AFC) is an efficient solution to compensate for a frequency offset. As shown in FIG. 3, a Phase-Locked Loop (PPL) 40 is a common structure for an AFC. The PPL 40 comprises a Phase Detector (PD) 42, a Loop Filter (LP) 44, and a Voltage Controlled Oscillator (VCO) 46. In FIG. 3, u1 (t) is the input signal and u2 (t) is the output of the VCO 46. The error (the phase difference in this case) is detected by the PD 42 and the output ud(t) of the PD 42 is proportional to the error. The detected output ud(t) is further filtered by the LP 44 and the output uf(t) of the LP 44 is sent to the VCO 46 where the control signal of the VCO 46 is generated. The phase error between the output u2 (t) of the VCO 46 and the input signal u1 (t) is detected again by the PD 42. This negative feedback reduces the phase error between u1 (t) and u2 (t).

Figure 4:
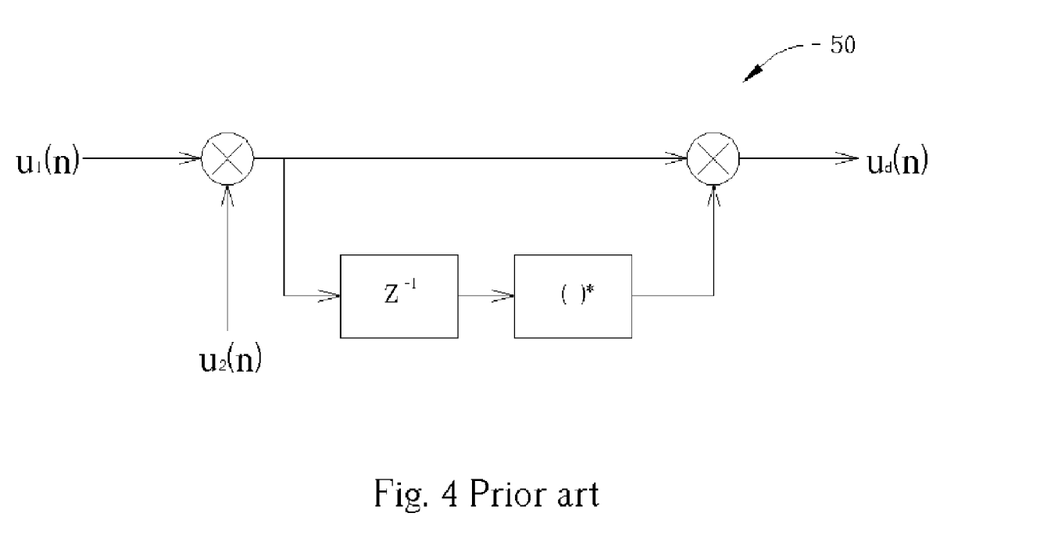
FIG. 4 is a block diagram of a frequency offset detector according to the prior art.

To implement the PPL 40 in baseband, the VCO 46 is replaced with a variable complex tone generator, and a multiplier and a frequency-offset detector replace the PD 42 to put the AFC into practice. A conventional offset detector 50 is shown in FIG. 4. The offset detector 50 takes the derivative of the input phase. In a digital baseband, after multiplying the input signal u1 (n) with the compensating signal u2 (n), this is achieved by multiplying the conjugate of the previous sample with the current sample. Stated mathematically, $ud(n)=u1(n)u2(n)[u1(n-1)u2(n-1)]^*$. This kind of detector is easily interfered with by Doppler spread and therefore the phase noise increases.

SUMMARY OF INVENTION

It is therefore a primary objective of the claimed invention to disclose an offset detector for automatic frequency control (AFC) in a 3GPP wireless communications network that performs well under Rayleigh fading.

Briefly summarized, the present invention AFC is a Phase-Locked Loop (PPL) having six parts. There is a phase detector block, a loop filter block, and a voltage controlled generator block, all modified to lock the frequency offset under Rayleigh fading and to work in baseband. The loop filter block of the AFC includes a low-pass filter and a gain amplifier. The phase detector block includes a multiplier and an offset detector. The voltage controlled generator block includes a variable phase generator and an exponential term $e^{j\,\Delta\omega t}$ multiplied on an incoming signal.

The present invention offset detector includes a filter, an amplifier, a delay block, three adders, and two blocks that output the absolute value of an inputted signal. In a preferred example of the present invention, the filter is a Finite Impulse Response (FIR) filter that produces a Hilbert Transformation of the inputted complex gain. The Hilbert filter, together with the complex gain and two of the adders, generate two complex signals: Xp and Xn respectively representing the positive and negative frequency components of the inputted complex gain. Other filters whose amplitude responses are DC-offset odd functions may be able to replace the Hilbert transformation filter without departing from the spirit of the invention. The detector output is equal to the difference between the magnitudes of Xp and Xn.

It is an advantage of the claimed invention that the disclosed offset detector for AFC performs well under Rayleigh fading, improving signal quality in a 3GPP wireless communications system.

DETAILED DESCRIPTION

The present invention discloses an offset detector for AFC that performs well under Rayleigh fading. Instead of operating in time domain, as does the prior art, the present invention operates in the frequency domain.

The spectrum of the complex channel gain under Rayleigh fading exhibits a "U" shaped curve. The effects of a frequency offset on a carrier phase can be modeled as multiplying the exponential term $e^{j \Delta \omega t}$ on an incoming signal, resulting in the "U" shaped curve being shifted by the same amount of frequency as the frequency offset. The Doppler spread is symmetric if there is no frequency off-set.

Figure 5:
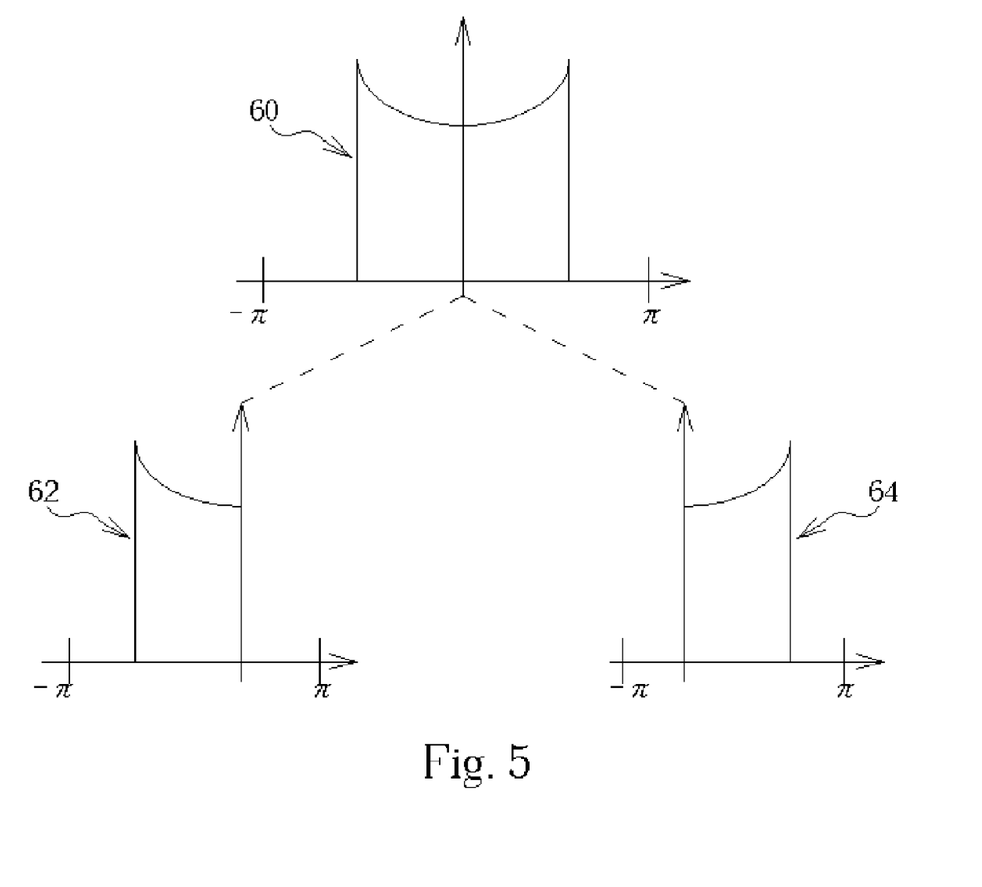
FIG. 5 illustrates the spectrum of a channel complex gain under Rayleigh fading without a frequency offset.
Figure 6:
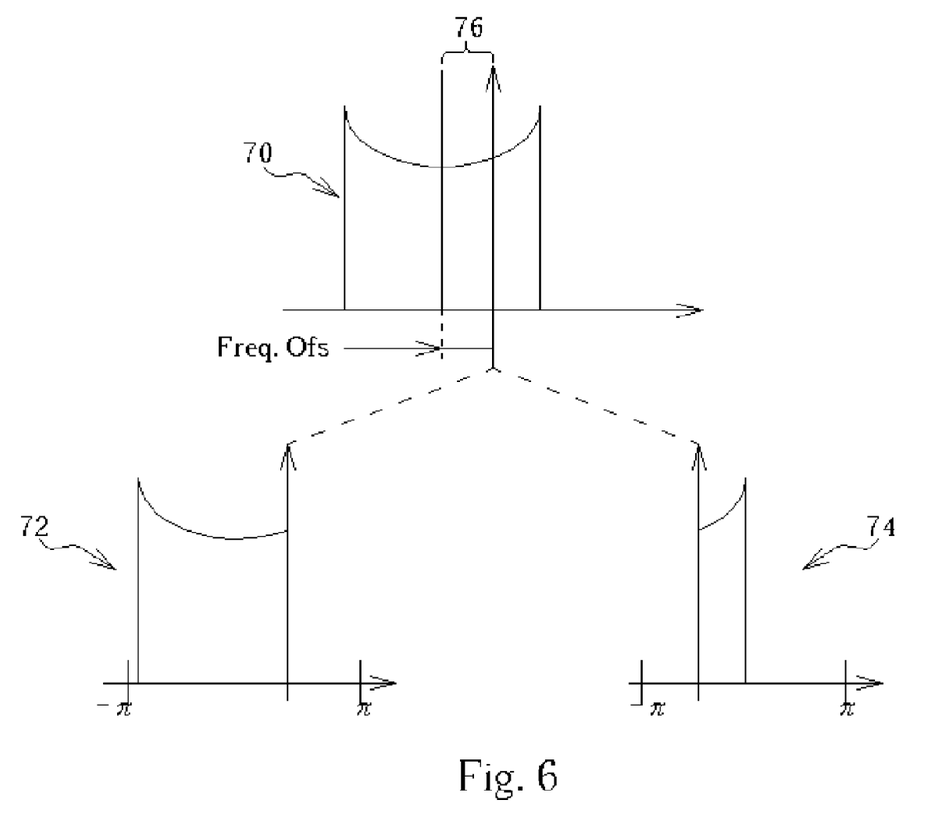
FIG. 6 illustrates the spectrum of a channel complex gain under Rayleigh fading with an example frequency offset.

Please refer to FIG. 5 and FIG. 6 for illustration of the effects of this multiplication. FIG. 5 shows the spectra of complex channel gain with no frequency offset after this multiplication. An original signal 60 and the corresponding negative part 62 and positive part 64 of the original signal 60 are shown. By comparison, FIG. 6 illustrates example spectra of a complex channel gain with a frequency offset 76 after this multiplication. An original signal 70, the frequency offset 76, and the corresponding negative part 72 and positive part 74 of the original signal 70 are shown. The present invention discloses a device and method that compensates for frequency offset by making use of these two parts of the received signal. An error signal is generated according to the power of positive and negative components.

Figure 7:
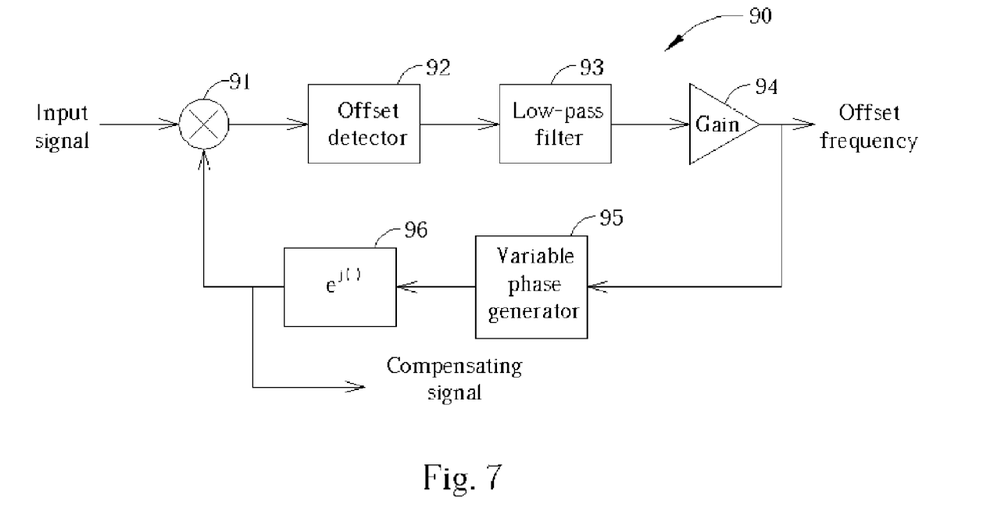
FIG. 7 is a block diagram of an automatic frequency control according to the present invention.
Figure 8:
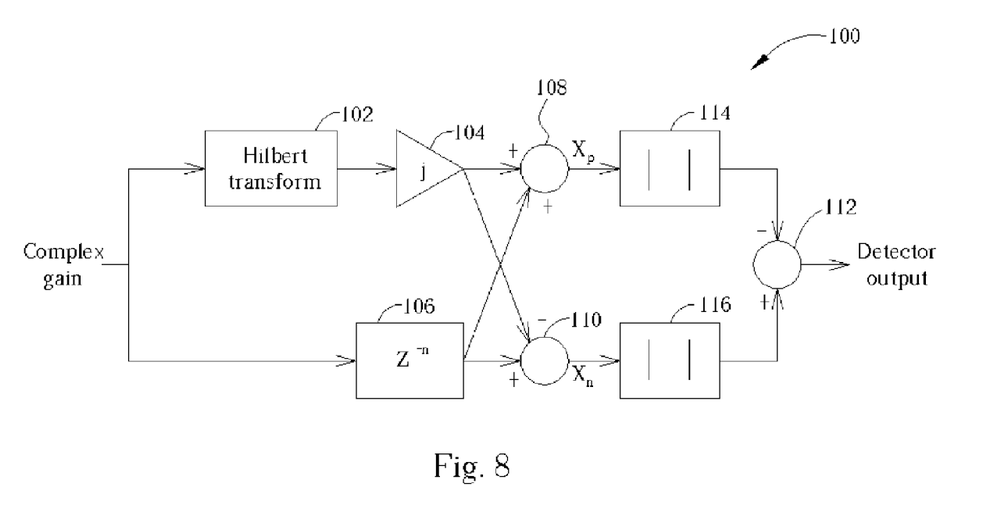
FIG. 8 is a block diagram of the offset detector shown in FIG. 7.

It can be seen from FIG. 7 that the present invention AFC 90 is a Phase-Locked Loop (PPL) comprising 6 parts. There is a phase detector, a loop filter, and a voltage controlled generator, but these blocks have been modified to lock the frequency offset under Rayleigh fading and work in baseband. The loop filter block of the AFC 90 comprises a low-pass filter 93 and a gain amplifier 94. The voltage controlled generator block comprises a variable phase generator 95 and the above described exponential term $e^{j \Delta \omega t}$ 96. The phase detector block of the AFC 90 comprises a multiplier 91 and an offset detector 92. FIG. 8 shows the details of the equivalent offset detector 100.

The present invention offset detector 100 shown in FIG. 8 comprises a Finite Impulse Response (FIR) filter 102, an amplifier 104, a delay block 106, three adders 108, 110, and 112, and two blocks 114 and 116 that output the absolute value of an inputted signal. The FIR filter 102 produces a Hilbert Transformation of the inputted complex gain. The Hilbert filter 102, together with the complex gain and the two adders 108 and 110, generate two complex signals: Xp and Xn representing the positive and negative frequency components respectively. The Hilbert transform is used to obtain a balance of the positive and negative frequency components. As shown in FIG. 8, Xp=X+j and Xn=x jx, where x is the output of the delay block 106 and jx is the output of the Hilbert filter 102 via the amplifier 104.

Figure 9:
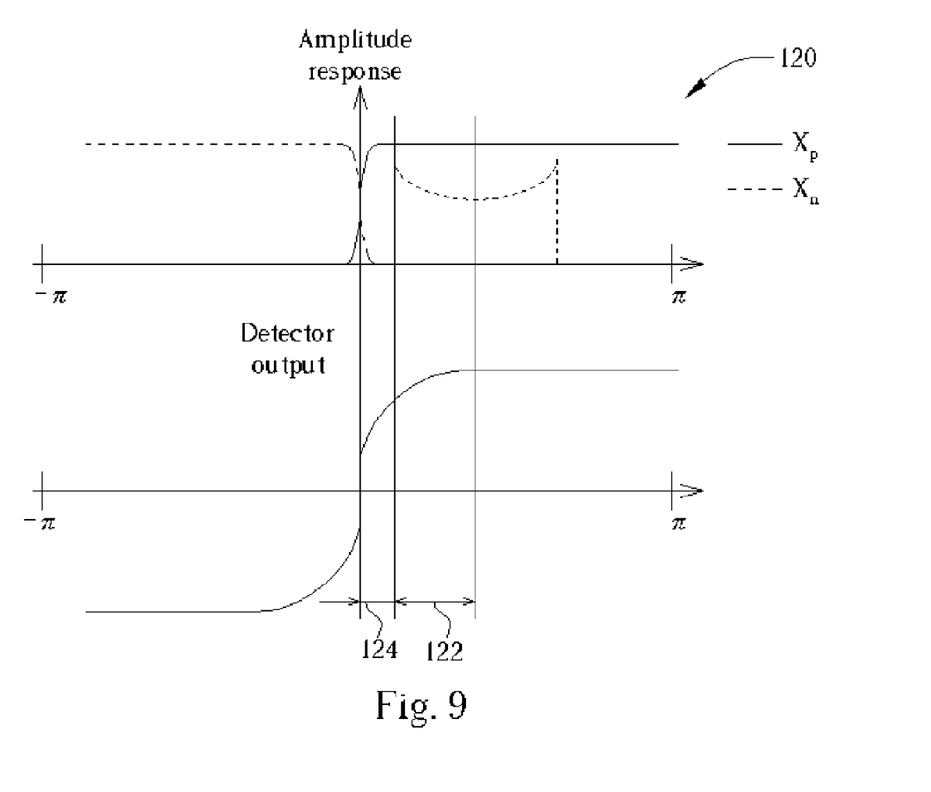
FIG. 9 is a graph of the output of the present invention offset detector versus frequency offset.

The detector output is equal to the difference between the magnitudes of Xp and Xn and a graph of the characteristics of the detector output 120 is shown in FIG. 9. Theoretically, the Hilbert transformation applied to the complex gain by the Hilbert filter 102 is non-causal and is of infinite response. This implementation results in the finite transition region 124 in FIG. 9 and the necessity of the delay block 106 in FIG. 8. In the finite transition region 124, the slope of the line represents the gain of the detector. The number of taps in the Hilbert filter 102 should be odd to simplify the delay block 106. FIG. 9 illustrates the characteristics using a 5-tap FIR filter as the Hilbert filter 102.

FIG. 9 also shows the saturation region of the detector 100. The detector 100 saturates if the frequency offset is larger than the summation of the transition region 124 and the Doppler spread 122. Altering the tap length in the Hilbert filter 102 can change the size of the transition region 124. A reduction in tap length increases the saturation frequency and reduces complexity. The Doppler spread 122 depends on the velocity of the mobile unit and therefore the knee of the detector 100 is not fixed. Fortunately, the saturation does not degrade the phase-locked loop 90.

Figure 10:
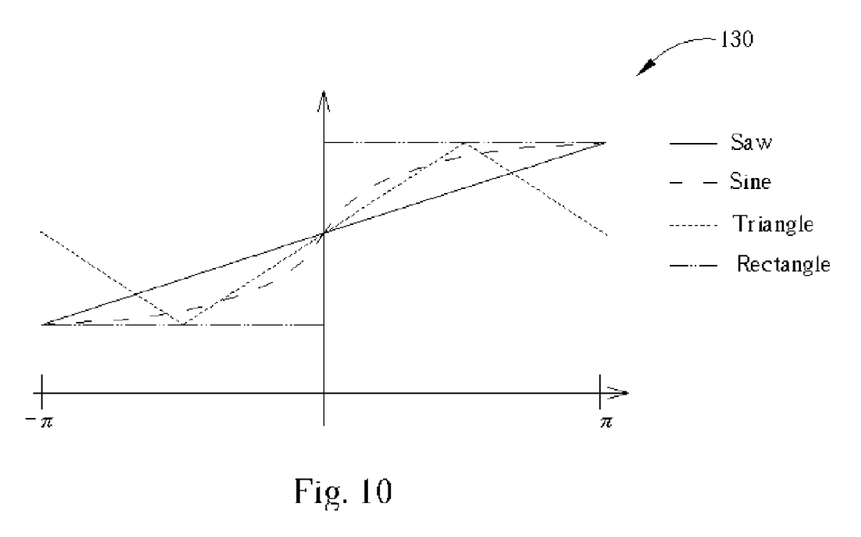
FIG. 10 is a graph of the output of another present invention offset detector versus frequency offset.

Other filters whose amplitude responses are DC-offset odd functions can replace the Hilbert transformation filter 102 without departing from the spirit of the invention. FIG. 10 shows amplitude responses of four examples of such alternate filters: a Saw filter, a Sine filter, a Triangle filter, and a Rectangle filter.

It is an advantage of the claimed invention that the disclosed offset detector for AFC performs well under Rayleigh fading, improving signal quality in a 3GPP wireless communications system.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. An offset detector for automatic frequency control in a 3GPP wireless communications network, the offset detector comprising:
    a filter whose amplitude responses are DC-offsetted, odd functions, the filter having an input for receiving a complex gain signal and an output;
    a delay block comprising an input for receiving the complex gain signal and an output;
    a first adder electrically connected to the output of the filter and the output of the delay block, the first adder outputting the sum of the output of the filter and the output of the delay block;
    a second adder electrically connected to the output of the filter and the output of the delay block, the second adder outputting the difference between the output of the filter and the output of the delay block; and
    a third adder electrically connected to the output of the first adder and to the output of the second adder, the third adder outputting the difference between the output of the first adder and the output of the second adder.

2. The offset detector of claim 1 wherein the output of the offset detector is equal to the difference in magnitudes between the output of the first adder and the output of the second adder.

3. The offset detector of claim 1 wherein the filter is a saw, sine, triangle, or rectangle filter.

4. The offset detector of claim 1 wherein the filter is a finite impulse response filter.

5. The offset detector of claim 4 wherein the filter performs a Hilbert transformation of the inputted complex gain signal.

6. The offset detector of claim 5 wherein the number of taps of the Hilbert transformation is odd.

7. The offset detector of claim 5 wherein the number of taps of the Hilbert transformation is five.

8. An offset detector utilized in automatic frequency control in a 3GPP wireless communications system, the offset detector comprising:
    a finite impulse response filter capable of performing a Hilbert transformation on an inputted complex gain signal;

a delay block, an input of the delay block connected to the complex gain signal;

a first adder connected to an output of the finite impulse response filter and to an output of the delay block, the first adder summing the output of the finite impulse response filter and the output of the delay block and outputting a first complex signal;

a second adder connected to the output of the finite impulse response filter and to the output of the delay block, the second adder subtracting the output of the delay block from the output of the finite impulse response filter and outputting a second complex signal; and a third adder connected to the output of the first adder and to the output of the second adder, the third adder outputting a signal equal to the difference between the magnitudes of the first complex signal and the second complex signal.

9. The offset detector of claim 8 wherein the number of taps in the finite impulse response filter is odd.

10. A method of detecting the frequency offset in automatic frequency control in a 3GPP wireless communications network, the method comprising:

utilizing a DC-offsetted odd functioned filter to transform an inputted complex gain signal;

generating two complex signals representing positive and negative frequency components utilizing the output of the DC-offsetted odd functioned filter and an output of a delay block; and generating a output signal equal to the difference between the magnitudes of the two complex signals.

11. The method of claim 10 wherein the DC-offsetted odd functioned filter is a saw filter, a sine filter, a triangle filter, or a rectangle filter.

12. The method of claim 10 wherein the DC-offsetted odd functioned filter is a finite impulse response filter.

13. The method of claim 12 wherein the finite impulse response filter comprises 5 taps.

14. The method of claim 12 wherein the transformation performed by the finite impulse response filter is a Hilbert transformation.

* * * * *

UNITED STATES PATENT AND TRADEMARK OFFICE
CERTIFICATE OF CORRECTION

PATENT NO. : 7,145,970 B2  Page 1 of 1
APPLICATION NO. : 10/604264
DATED : December 5, 2006
INVENTOR(S) : Bao-Chi Peng It is certified that error appears in the above-identified patent and that said Letters Patent is hereby corrected as shown below:

On the Title Page, Item (73), Assignee, the name of the assignee should be corrected from "Beno Corporation"

to --BenQ Corporation--

Signed and Sealed this

Fifth Day of February, 2008

JON W. DUDAS
*Director of the United States Patent and Trademark Office*